United States Patent [19]

Greiner et al.

[11] Patent Number: 5,007,331

[45] Date of Patent: Apr. 16, 1991

[54] DRY RUN-HIGH PRESSURE STAGE OF A MULTISTAGE PISTON COMPRESSOR

[75] Inventors: Peter Greiner, Damooser Weg 15, DE- 7981 Vogt; Hubert Pflüger, Schlier-Wetzisreute, both of Fed. Rep. of Germany

[73] Assignee: Peter Greiner, Vogt, Fed. Rep. of Germany

[21] Appl. No.: 449,576

[22] Filed: Dec. 12, 1989

[30] Foreign Application Priority Data

Dec. 13, 1988 [DE] Fed. Rep. of Germany ....... 3841833

[51] Int. Cl.[5] ............................................ F16J 15/18

[52] U.S. Cl. .................................. 92/165 R; 92/153; 92/158; 92/248; 92/255; 92/261; 417/572; 417/266; 277/58

[58] Field of Search .................. 92/86.5, 59, 153, 155, 92/158, 172, 165, 178, 248, 261, 255; 417/572, 266, 569; 277/167.3, 58

[56] References Cited

U.S. PATENT DOCUMENTS

| | | | |
|---|---|---|---|
| 334,037 | 1/1886 | Nash | 92/155 |
| 2,344,687 | 3/1944 | Fischer et al. | 92/155 |
| 3,315,881 | 4/1967 | Halpin et al. | 92/155 |
| 4,873,913 | 10/1989 | Pruitt et al. | 92/158 |

FOREIGN PATENT DOCUMENTS

| | | | |
|---|---|---|---|
| 276956 | 12/1969 | Austria . | |
| 829249 | 12/1951 | Fed. Rep. of Germany | 277/58 |
| 1043346 | 11/1958 | Fed. Rep. of Germany | 92/155 |
| 2138845 | 8/1971 | Fed. Rep. of Germany . | |
| 3607497 | 3/1986 | Fed. Rep. of Germany . | |
| 359825 | 12/1957 | Switzerland . | |
| 1148398 | 4/1969 | United Kingdom | 92/165 |
| 1487311 | 10/1974 | United Kingdom . | |

*Primary Examiner*—John T. Kwon
*Assistant Examiner*—Thomas Denion
*Attorney, Agent, or Firm*—Kurt Kelman

[57] ABSTRACT

The invention relates to the dry run-high pressure stage of a multistage piston compressor with a piston designed as a tappet (2) guided in the high pressure cylinder (1) and sealed against the compression space of the cylinder (1) by means of self-lubricating sealing elements (3) forming an annular gap together with the working surface, whereby the latter is formed by a material suitable for dry run. According to the invention, the sealing elements having a height conforming at least to their diameter are embodied in the form of at least two cylindrical sealing elements (3), which are loosely placed one on top of the other in the cylinder (1) on the free end of the tappet (2), provided with working surface guides at least in part areas, and have chamfers (6) on the face side.

7 Claims, 2 Drawing Sheets

DRY RUN-HIGH PRESSURE STAGE OF A MULTISTAGE PISTON COMPRESSOR

The invention relates to the dry run-high pressure stage of a multistage piston compressor with a piston designed as a tappet guided in the high-pressure cylinder and sealed against the compression space of the cylinder by means of self-lubricating sealing elements forming an annular gap jointly with the working surface, whereby the latter is formed by a material suitable for the dry run.

BACKGROUND OF THE INVENTION

High-pressure stages of multistage piston compressors are known, for example from GB-PS No. 1,487,311. In said known high-pressure piston compressor, it is no longer necessary to maintain an oil film between the piston and the working surface of the cylinder for the purpose of sealing and lubricating, i.e., to permanently lucricate with oil, as graphite is used for the working surface for said purpose, and self-lubricating plastic material is used for the actual sealing elements, such plastic material being suitable for this case of application. However, nothing has changed in the known and conventional design of the piston in the high-pressure stage, i.e., in order to obtain adequate tightness between the piston and the working surface of the cylinder, provision has to be made for a great number of piston rings in matching annular grooves on the piston. Aside from the manufacturing expenditure in that regard, the piston rings seated in the annular grooves of the piston must, of course, have a certain clearance with respect to said rings, and furthermore, measures are required to insure that the piston rings will always rest against the working surface of the cylinder. This is unavoidably connected with losses due to leaking, leakage and wear, and additionally with leakage losses resulting from such wear.

OBJECTS OF THE INVENTION

It is the primary object of the invention to provide a piston sealing for the dry-running high-pressure stage of a multistage piston compressor, which has the lowest possible leaking rate and a long service life combined with low wear while being of simple construction.

Further object of the invention relate to particularly beneficial embodiments of the sealing elements.

SUMMARY OF THE INVENTION

In a dry run-high pressure stage of a multistage piston compressor comprising a cylinder defining a compression chamber and having a working barrel whose interior wall defines a bore, a piston including a tappet guided for reciprocal replacement in the working barrel bore, the tappet having a free end extending into the bore, these objects are accomplished according to the invention with at least two cylindrical self-lubricating sealing elements loosely placed on top of each other on the free tappet end and sealing the working barrel bore from the compression chamber, the sealing elements having a height corresponding at least to the diameter thereof, circumferential guide surfaces extending at least along a portion of the circumferential surfaces of the sealing elements and defining an annular gap with the interior working barrel wall, and two end faces having circumferentially extending chamfers.

While a special material selection for the cylinder and for the self-lubricating sealing elements is required the invention is decisively based on the special design and arrangement of the sealing elements, which are placed on the free end of the tappet. For said elements it is important that they have a relatively low specific weight by virtue of their material, and that the two sealing elements, which are placed one on top of each other, form a groove extending all around, while tightly resting against each other, said groove forming the access to the gap between the sealing elements. The relatively low specific weight of the material ensures that the sealing elements will not come flying out upwardly into the head space of the cylinder when the operating stroke accelerates, and that said sealing elements are retained by the medium, which is already under pressure and to be compressed further. The high sealing effect surprisingly resulting from such an embodiment and arrangement of the sealing elements is, per se, difficult to explain, and it can only be assumed that the loose arrangement of the at least two sealing elements on the tappet and their arrangement relative to one another leads, during the translative motion, to a type of labyrinth, in which the medium, which is to be compressed further, is capable of relieving itself to a certain degree within said zone, such relief preventing it from "flashing through" to the driving side past the tappet. The clearance to be adjusted between the sealing elements and the working surface of the piston has to be dimensioned in such a way that parallel guiding of the sealing elements in the cylinder is assured, i.e., said clearance has to be dimensioned as minimal as possible, because canting or tilting might otherwise occur during the motion of the sealing elements, which would lead to a destruction of the sealing elements. In the practical embodiment, the tolerance to be preset for the guide surface of the sealing elements relative to the working surface amounts to 0.002 to 0.005 mm at the most. In order to even consider such an embodiment with an oil-free operation in the high-pressure stage, it is necessary to make a special material selection for the sealing elements and the interior cylinder wall, such selection being for the actual embodiment that the material of the sealing elements, first of all, is adjusted to a lower coefficient of thermal expansion than the material of the working surface of the cylinder, preferably in a way such that the coefficient of thermal expansion of the sealing elements is adjusted by 20 to 25% lower than the one of the working surface of the cylinder. The sealing elements consist of a modified plastic material or a suitable ceramic material, either entirely or they are coated with such materials on their sides facing the working surface, and the working surface of the cylinder or of the bushing inserted therein is made of silicon carbide, or of a suitable ceramic material. The selection of suitable materials, however, does not pose any problem since such or similar suitable materials are known for the construction of pumps and compressors, for example according to AT 276 956, DE 2 138 845, CH 359 825, and DE 3 607 497.

Furthermore, depending on the final pressures to be considered and the number of sealing elements arranged in the cylinder, it may be useful to provide the circumferential surfaces of the sealing elements with at least one circumferential groove preferably having a V-shaped cross section and constantly extending contours at least within the zone of the bottom of the groove, in order to establish as few preconditions as possible for any breakage of the sealing elements within said zone.

Considering that some oil, though only in small amounts, may seep in from the pre-stages in spite of having an oil separator or filter installed upstream, it has been found that it is useful to design the adjoining end faces of the sealing elements in a very slightly spherical form. It is useful in view of the load conditions to design the spherical end face areas with planar surfaces in their center zones in order to avoid point-like or small load areas between the elements and between the lowermost sealing elements and the contact surface of the tappet. The slightly spherical shape enlarges, on the one hand, the labyrinth-like relief spaces between the elements, and, on the other hand, creates space for traces coking residues of the oil admitted, which then are easily detached by the quasi pulsating motion of the sealing elements and discharged as solid trace particles, and which then can be easily collected in the filter mounted downstream. In addition, the slightly spherical shape of the faces contributes to preventing the elements from jamming.

BRIEF DESCRIPTION OF THE FIGURES OF THE DRAWINGS

The high-pressure stage of a piston compressor according to the invention is explained in greater detail in the following by reference to the embodiments shown by way of example in the schematic drawing, in which.

DESCRIPTION OF THE FIGURES

Figure 1:
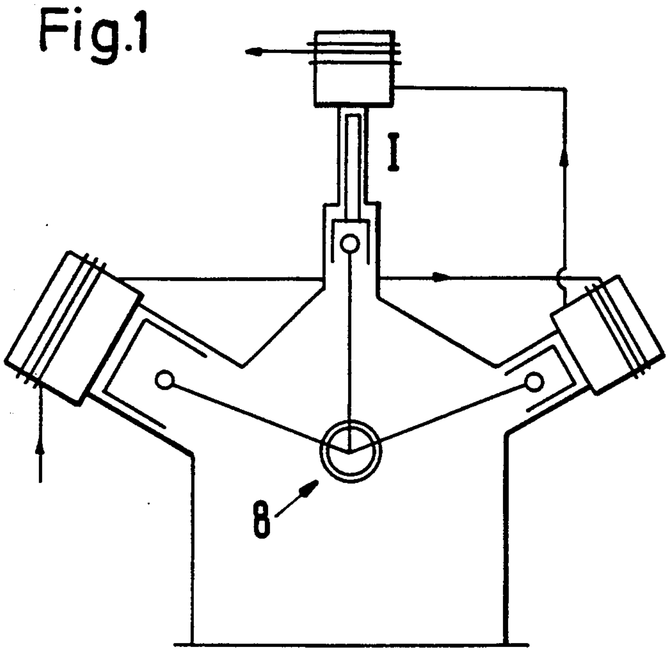
FIG. 1 is a sectional and general view of a conventional high-pressure piston compressor operating in three stages.
Figure 2:
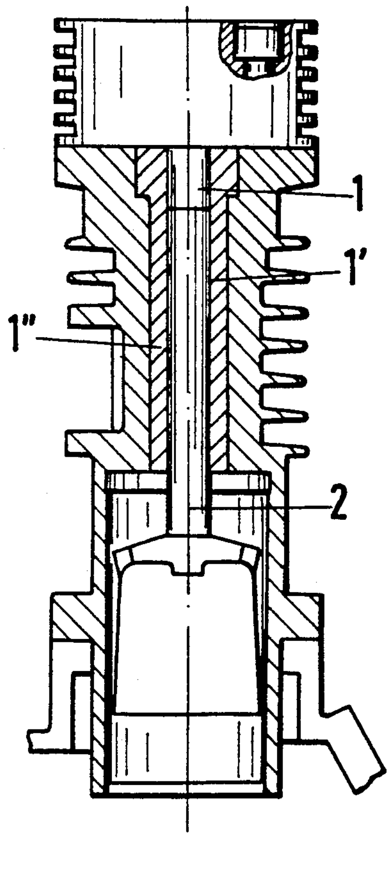
FIG. 2 shows a section through the high-pressure stage with the tappet drive.

FIGS. 1 and 2 show that the high-pressure piston compressor comprises several pistons movable by the common drive 8 in cylinders fitted with infeed and discharge valves (not shown), the piston in the high-pressure stage I having the smallest diameter and being guided as tappet 2 in the working barrel displacement bore of the high-pressure cylinder 1.

Figure 3:
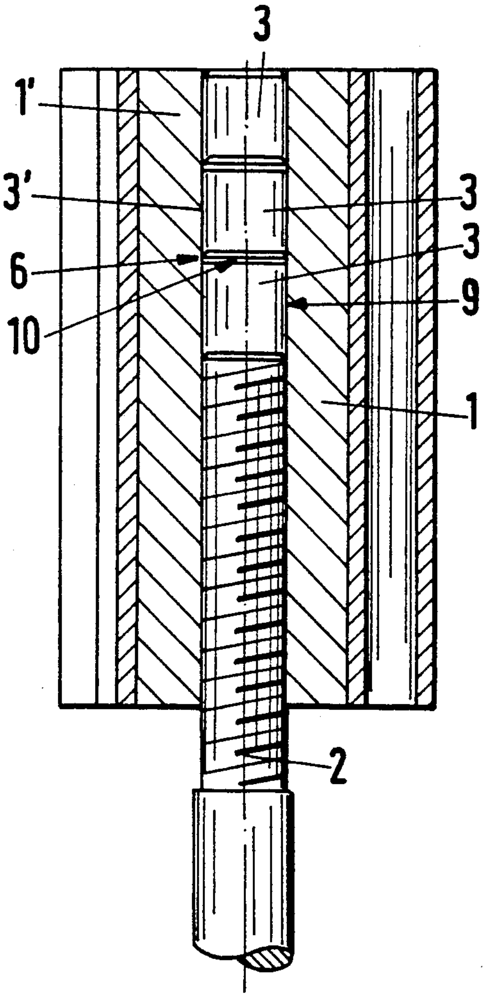
FIG. 3 shows a section through the cylinder of the high-pressure stage with the tappet and the sealing elements arranged on the latter.

FIG. 3 shows three cylindrical sealing elements 3 loosely placed one on top of each other on the tappet 2 in the bore of the working barrel, said sealing elements having the chamfers 6 (see in particular FIG. 4) in the zones 4 of their circumferential edges of their adjoining end faces 5. Said sealing elements 3 define clearance with the interior wall of the cylinder, assuring their parallel guidance in the bore of the working barrel of cylinder 1, said clearance amounting to only 0.002 to 0.005 mm. As the sealing elements 3 are cylindrical except for the chamfers 6, the entire circumferential surfaces form guide surfaces 3' of said elements. Hence the gap 9 present between the guide surfaces of sealing elements 3 and the interior wall 1' of the cylinder 1 is expanded by the chamfers 6 within the zone 10 where the sealing elements adjoin each other, and said gap has larger cross sections in said zone.

The sealing elements 3 and the cylinder 1 or bushing 1'' inserted into the bore of the working barrel of the cylinder have at least their working surfaces formed by materials based, for example on modified carbons, ceramic materials and/or silicon carbide (i.e., in the form of coatings), so that the sealing elements 3 consist wholly of or their guide surfaces 3' are coated with, modified carbon a ceramic material, and the interior wall 1' of the cylinder 1 is made of silicon carbide or a suitable ceramic material. In spite of the small clearance, such a material selection assures trouble-free operation of the entire high-pressure stage in an oil-free operation and with optimal sealing without showing any errosive damage on the cooperating parts, as has been found in long-term tests lasting hundreds of hours of operation. As such materials can be readily adjusted also with respect to their coefficients of expansion by compounding them accordingly, such materials have been selected in such a way that the sealing elements 3 have a coefficient of thermal expansion that is by 20 to 25% lower than the one of the material used for the interior wall of the cylinder. The afore-mentioned sealing effect remains fully intact irrespective of the greater expansion of the interior wall of the cylinder caused by the temperature load.

Figure 4:
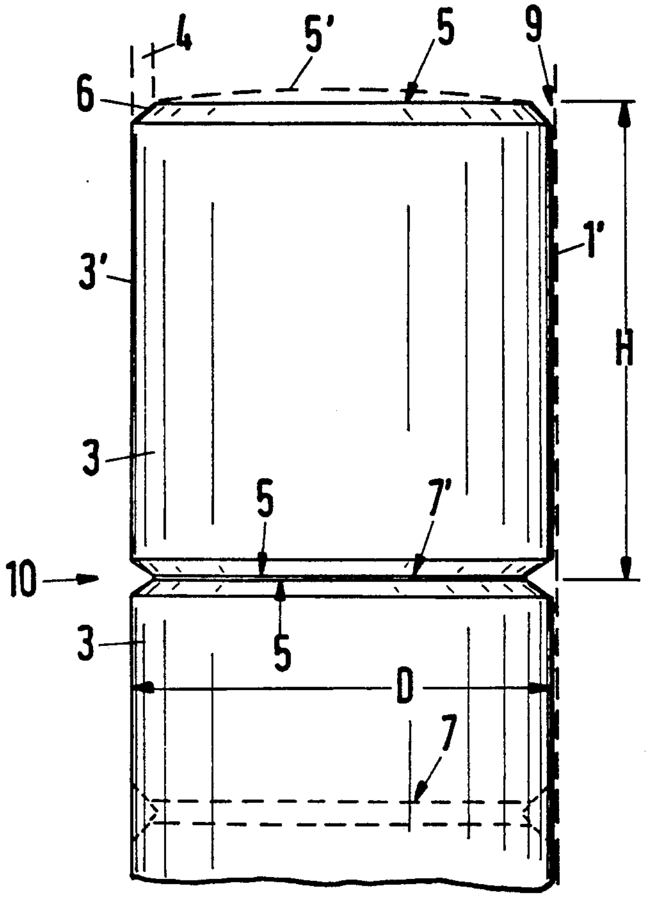
FIG. 4 is a greatly enlarged side view of two sealing elements seated one on top of the other.
Figure 5:
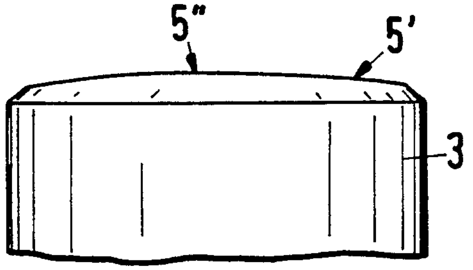
FIG. 5 is a fragmentary side view of one embodiment of the sealing element.
Figure 6:
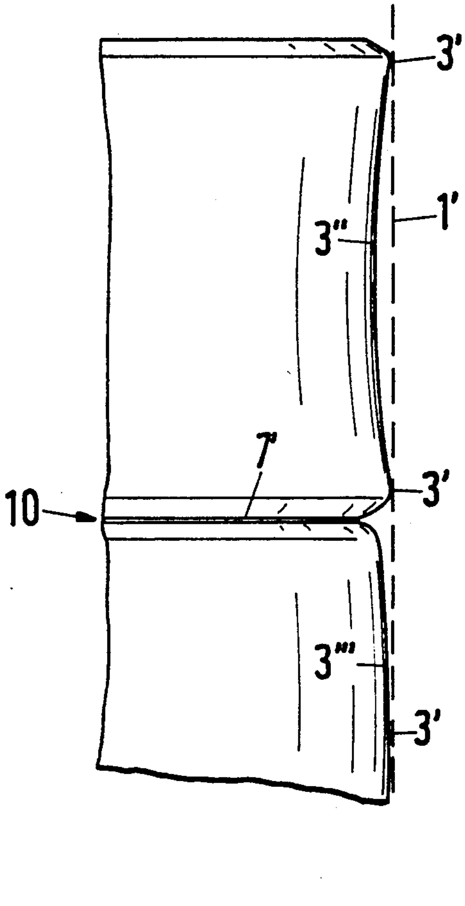
FIG. 6 shows greatly enlarged other embodiments of the sealing elements.

FIG. 4 shows a greatly enlarged view of the two sealing elements 3. The figure shows that provision is made for the chamfers 6 on the two facing end faces 5 of the sealing elements, such chamfers being located in the circumferential edge zones 4 of each element, which results in grooves of V-shaped cross sections extending all around and gap 7' between the two elements, said gap 7' extending like a diaphragm that is outwardly bounded by a circumferential groove. Each sealing element may additionally have a circumferential 7 extending half way between end faces 5, such groove usefully being contoured as mentioned in the introductory part. The shape of the end faces may be spherical as shown at the top in FIG. 4 by dashed lines, and the extremely slight curvature does advantageously not include the center zone 5'' in order to avoid point-like or small sized load areas, i.e., the end faces 5 have a plane shape in their centers, as shown in FIG. 5. According to FIG. 6, the sealing elements 3 may also be provided with a circumferwntial surface 3'' and 3''' extending in a concave (top) and convex (bottom) form, respectively, between their guide surfaces 3', and it is possible, furthermore, to design the circumferential surface of an element 3 in part with an alternating concave and convex shape, i.e., with a wave-like configuration. Such deviations from a cylindrical surface, i.e., the depth of the concavity and the height of the convexity, however, are always within the order of magnitude of about 0.05 mm.

EXAMPLE

A three-stage HP-compressor tested in a long-term trial run had the following operating data in the high-pressure stage (330 bar):

| | |
|---|---|
| Medium | Air |
| Inlet pressure | 60 bar |
| Outlet pressure | 300 bar |
| Stroke (displacement) | 40 mm, v = 2 m/s |
| Number of | 1200 min-1 |

-continued

| | |
|---|---|
| revolutions | |
| Service life | L h min = 1000 hours, at a delivery drop of 6% maximum |
| Interior temp. | abt. 210° C. at 300 bar |

Material of the components of the operating equipment:

Working bushing made of SiSiC-SH 5311 or SiSiC-SK 6314 (SIGRI)

Tappet made of hardened steel—Sealing elements made of modified carbon EK 3115 or EK 3105 (Ringsdorff quality)

Design of the sealing elements: 3 units, 12 mm diameter, height 13.3 mm, cylindrical, with chamfers 6 according to FIGS. 3 and 5.

| | |
|---|---|
| Width of chamfer | 0.7 mm |
| Inclination of chamfer | 30° |

While the the present embodiments of the invention and the methods of working said invention are illustrated and described by way of example, it is understood that said invention may be otherwise embodied and practiced in various ways within the scope of the following claims.

What is claim is:

1. A dry-run, high-pressure stage of a multi-stage piston compressor comprising a cylinder defining a compression chamber and having a working barrel whose interior wall defines a bore, a piston including a tappet guided for reciprocal displacement in the working barrel bore, the tappet having a free end extending into the bore, and at least two cylindrical self-lubricating sealing elements loosely placed on top of each other on the free tappet end and sealing the working barrel bore from the compression chamber, the cylindrical sealing elements having a height corresponding at least to the diameter thereof, circumferential guide surfaces extending at least along a portion of the circumferential surfaces of the sealing elements and defining an annular gap with the interior working barrel wall, and two end faces having circumferentially extending chamfers.

2. The dry-run, high-pressure stage of claim 1, wherein the circumferential surfaces of the sealing elements define at least one circumferentially extending groove between the end faces.

3. The dry-run, high-pressure stage of claim 1, wherein the end faces of the sealing elements are at least partly spherical and the chamfers are constituted by a circumferential part of the spherical end faces.

4. The dry-run, high-pressure stage of claim 3, wherein the partly spherical end faces are planar in their center zones.

5. The dry-run, high-pressure stage of claim 1, wherein the circumferential guide surfaces extend along a portion of the circumferential surfaces of the sealing elements and another portion of the circumferential surfaces of the sealing elements is concave.

6. The dry-run, high-pressure stage of claim 1, wherein the circumferential guide surfaces extend along a portion of the circumferential surfaces of the sealing elements and another portion of the circumferential surfaces of the sealing elements is convex.

7. The dry-run, high-pressure stage of claim 1, wherein the circumferential guide surfaces extend along a portion of the circumferential surfaces of the sealing elements and other portions of the circumferential surfaces of the sealing elements are alternately concave and convex.

* * * * *